United States Patent
Lueschow et al.

(10) Patent No.: US 7,480,579 B2
(45) Date of Patent: Jan. 20, 2009

(54) METHOD AND APPARATUS FOR PERFORMING TEMPERATURE COMPENSATION FOR A PAYLOAD MEASUREMENT SYSTEM

(75) Inventors: Kevin J. Lueschow, Elmwood, IL (US); Jody M. Drake, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 93 days.

(21) Appl. No.: 11/315,770

(22) Filed: Dec. 22, 2005

(65) Prior Publication Data

US 2006/0100808 A1     May 11, 2006

Related U.S. Application Data

(63) Continuation-in-part of application No. 10/610,503, filed on Jun. 30, 2003, now abandoned.

(51) Int. Cl.
    *G01G 23/01*     (2006.01)
    *G01F 19/00*     (2006.01)

(52) U.S. Cl. ............... 702/101; 177/141; 702/99; 702/100; 702/174

(58) Field of Classification Search ............... 702/100, 702/101, 104, 174, 99; 701/50, 124; 177/25.14, 177/136, 139, 141; 73/1.13
See application file for complete search history.

(56) References Cited

U.S. PATENT DOCUMENTS

| | | | |
|---|---|---|---|
| 4,475,609 A | 10/1984 | Sakai et al. | |
| 5,067,572 A | 11/1991 | Kyrtsos et al. | |
| 5,070,953 A | 12/1991 | Kyrtsos et al. | |
| 5,082,071 A | 1/1992 | Kyrtsos et al. | |
| 5,105,895 A | 4/1992 | Kyrtsos | |
| 5,105,896 A | 4/1992 | Kyrtsos | |
| 5,139,101 A | 8/1992 | Smith | |
| 5,178,226 A | 1/1993 | Bowman et al. | |
| 5,182,712 A | 1/1993 | Kyrtsos et al. | |
| 5,195,418 A | 3/1993 | Smith | |
| 5,214,586 A | 5/1993 | Nance | |
| 5,287,885 A | 2/1994 | Smith | |
| 5,329,441 A | 7/1994 | Aoki et al. | |
| 5,472,056 A | 12/1995 | Orbach | |
| 5,509,293 A | 4/1996 | Karumanchi | |

(Continued)

FOREIGN PATENT DOCUMENTS

| | | |
|---|---|---|
| GB | 1575291 | 9/1980 |
| GB | 2103811 | 2/1983 |

*Primary Examiner*—John H Le
(74) *Attorney, Agent, or Firm*—Kevin C. Earle; Finnegan, Henderson, Farabow, Garrett & Dunner

(57) ABSTRACT

The present invention provides a method and apparatus configured to perform relative load compensation for a payload measurement system of a machine. The machine has at least one cylinder for elevating a payload carrier. The cylinder is connected to a fluid circuit having an actuating fluid. The payload measurement system is calibrated. Then a load of unknown weight is lifted. To determine the weight of this load, the system determines an uncompensated payload weight as a function of sensed pressure values of the actuating fluid. Temperature of the actuating fluid is sensed at the time of calibration and at a time of lift and the difference is scaled. A payload weight is determined as a function of the scaled temperature and the uncompensated payload weight.

10 Claims, 4 Drawing Sheets

U.S. PATENT DOCUMENTS

| | | |
|---|---|---|
| 5,548,517 A | 8/1996 | Nance |
| 5,606,516 A | 2/1997 | Douglas et al. |
| 5,666,295 A | 9/1997 | Bruns |
| 5,824,965 A | 10/1998 | Fujii et al. |
| 5,880,408 A | 3/1999 | Schreiner |
| 5,955,706 A | 9/1999 | Fonkalsrud et al. |
| 5,968,104 A | 10/1999 | Egawa et al. |
| 6,016,875 A | 1/2000 | Orbach et al. |
| 6,552,279 B1 | 4/2003 | Lueschow et al. |

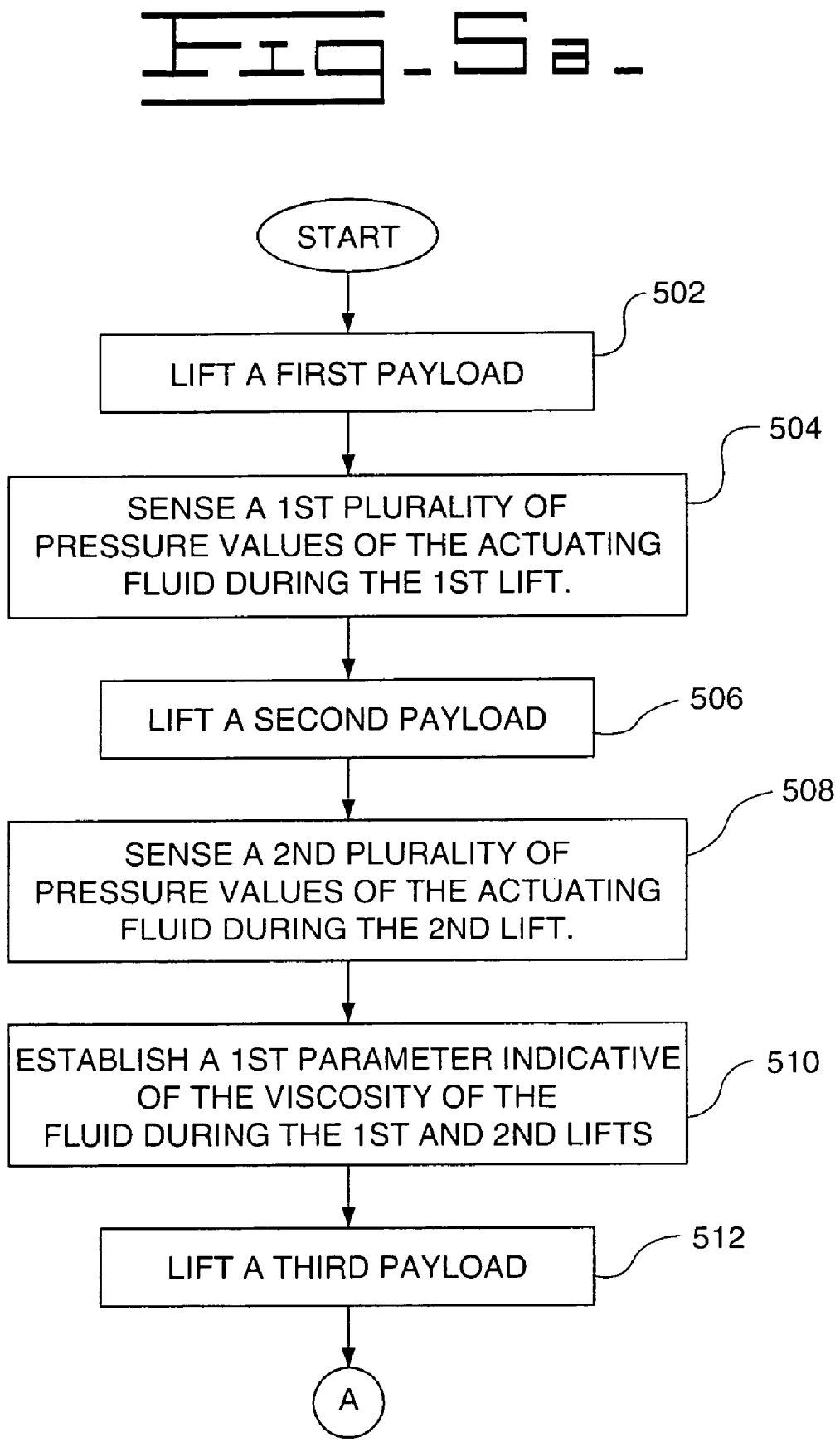
Fig_5a_

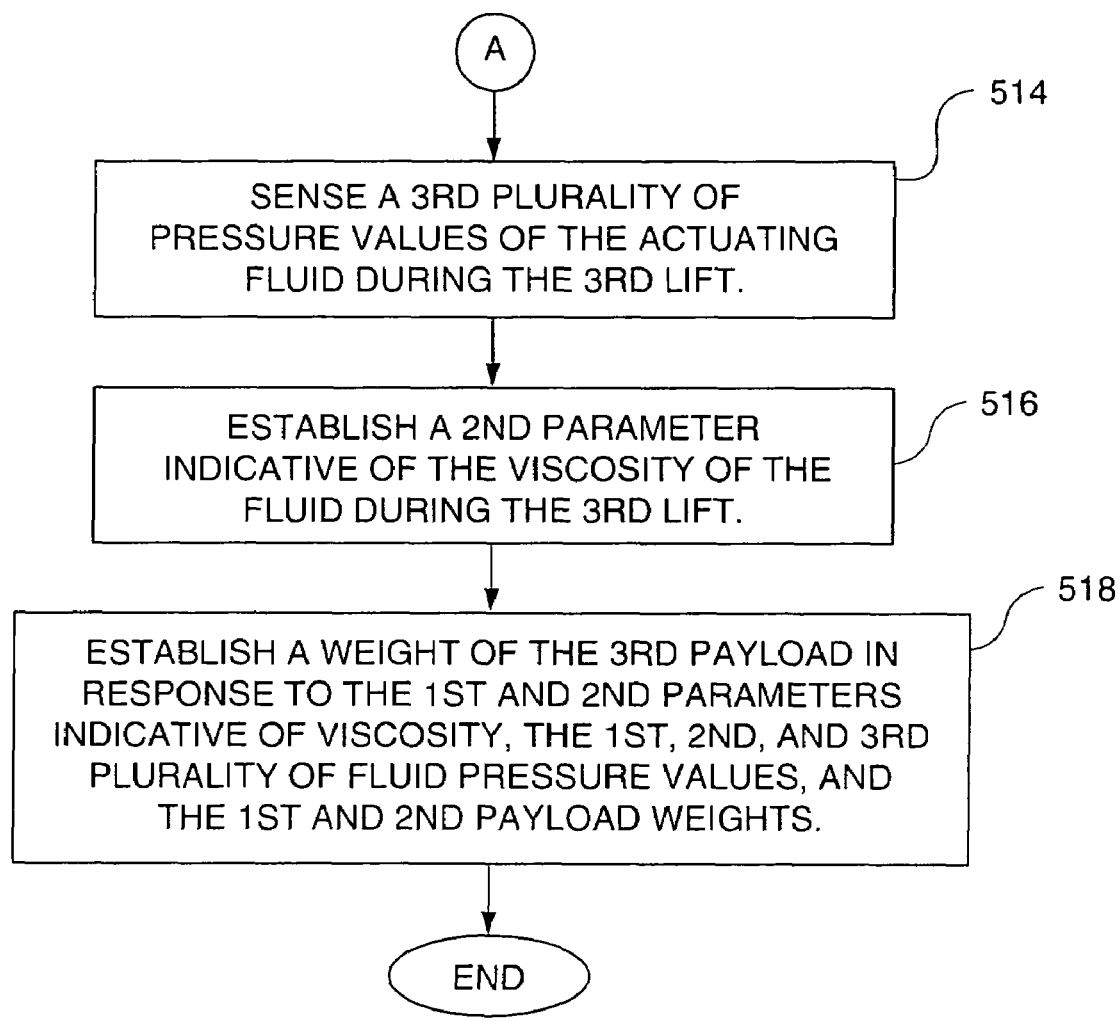
Fig_5b_

METHOD AND APPARATUS FOR PERFORMING TEMPERATURE COMPENSATION FOR A PAYLOAD MEASUREMENT SYSTEM

RELATION TO OTHER PATENT

This application is a continuation-in-part of patent application Ser. No. 10/610,503, filed on Jun. 30, 2003 now abandoned.

TECHNICAL FIELD

This invention relates generally to machines for transferring bulk material and, more particularly, to an apparatus and method for determining the weight of the bulk material being transferred.

BACKGROUND

Machines such as loaders are used generally to transfer bulk material from a stock pile onto transport machines such as trucks or railroad cars. In such machine loading applications, it typically is desirable that the transport machines are loaded to, but not over, their maximum rated capacity. Under-loading of a machine causes inefficiency in the material hauling cycle and under-utilization of such transport machines. Overloading causes additional maintenance cost and extra wear on tires and suspension systems of the machine. Furthermore, the overloaded material may need to be unloaded to decrease load weight, thus causing additional expense. Therefore, accurate payload measurement is desirable.

Payload measurement is also desirable as a method of determining operation productivity. For example, the ability to accumulate the weight of the material loaded during a single shift, during a twenty-four hour period, or during any other time period may be valuable to an operations manager.

Payload measurement systems have been developed which utilize sensed lift cylinder pressures which enable the system to be calibrated using known weights and then to determine payload weight during the operation of the machine. This measurement method is dependent on the pressure to weight ratio remaining consistent between the time the machine is calibrated and the time the machine is measuring an unknown load. In addition, such systems assume the pressure to weight ratio remains consistent over a wide temperature range. It is known to adjust a measurement system for changes in ambient temperature; in addition, it is generally known to compensate a measured payload for changes in the actuating fluid temperature. Such systems typically scale the measured payload weight with an absolute coefficient. However, using an absolute number does not take into account changes in the relative weight of the load.

The present invention is directed to overcoming one or more of the problems set forth above.

SUMMARY OF THE INVENTION

It is to be understood that both the foregoing general description and the following detailed description are exemplary and explanatory only and are not restrictive of the invention as claimed.

In a first embodiment, a method for dynamically measuring a payload weight for a machine is disclosed. The machine has at least one cylinder for elevating a payload carrier, with the cylinder being connected to a fluid circuit having an actuating fluid. The method comprises determining a calibration weight associated with the payload carrier; determining a calibration temperature of the actuating fluid at the time of calibration weight determination; determining an uncompensated payload weight; determining a temperature change between the calibration temperature and a current temperature; applying a first scaling conversion factor to the temperature change; and determining the payload weight as a function of at least the uncompensated payload weight and the scaled temperature change.

BRIEF DESCRIPTION OF THE DRAWINGS

FIGS. 5A, 5B illustrate an exemplary embodiment of a method of the present invention.

DETAILED DESCRIPTION

Figure 1:
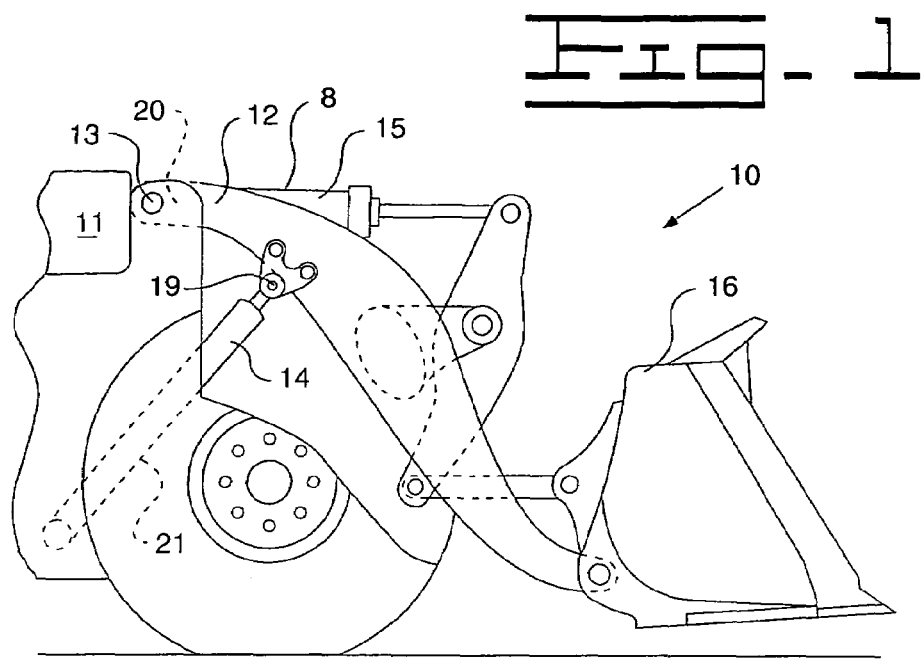
FIG. 1 is a side view of the forward portion of a loader machine incorporating an exemplary embodiment of the present invention.

In FIG. 1, a payload monitoring system is generally represented by the element number 10. Although FIG. 1 shows a forward portion of a wheel type loader machine 11 having a payload carrier in the form of a bucket 16, the present invention is equally applicable to machines such as track type loaders, dump trucks, and other machines having similar loading capabilities. The bucket 16 is connected to a lift arm assembly 12, which is pivotally actuated by two hydraulic lift cylinders 14 (only one of which is shown) about a pair of lift arm pivot pins 13 (only one of which is shown) attached to the vehicle frame. A pair of lift arm load bearing pivot pins 19 (only one of which is shown) are attached to the lift arm assembly 12 and the lift cylinders 14. The bucket 16 may also be tilted by a bucket tilt cylinder 15.

The payload monitoring system 10 includes an extension sensor 20 configured to sense a characteristic indicative of the extension of the cylinder 14. In one embodiment, the extension sensor is a rotary sensor 20 configured to sense the rotation of one of the lift arm pivot pins 13 from which the geometry of the lift arm assembly 12 or the extension of the lift cylinders 14 can be derived. The same rotary sensor 20 can be alternatively installed on the load bearing pivot pins 19 to provide the same information. In an alternative embodiment, the extension sensor 20 is a position sensor configured to sense the extension, or position, of a cylinder 14.

A pressure transducer 21 senses the hydraulic pressure in one of the lift cylinders 14. Although there are two cylinders 14, the pressure in the cylinders is generally the same for a given payload and given lift arm assembly geometry. Thus, sensing fluid pressure associated with one of the cylinders 14 is sufficient for the present application. In addition, the cylinder 14 is connected to and receives actuating fluid from an actuating fluid circuit 202, such as for example a hydraulic circuit, illustrated in FIG. 2.

Figure 2:
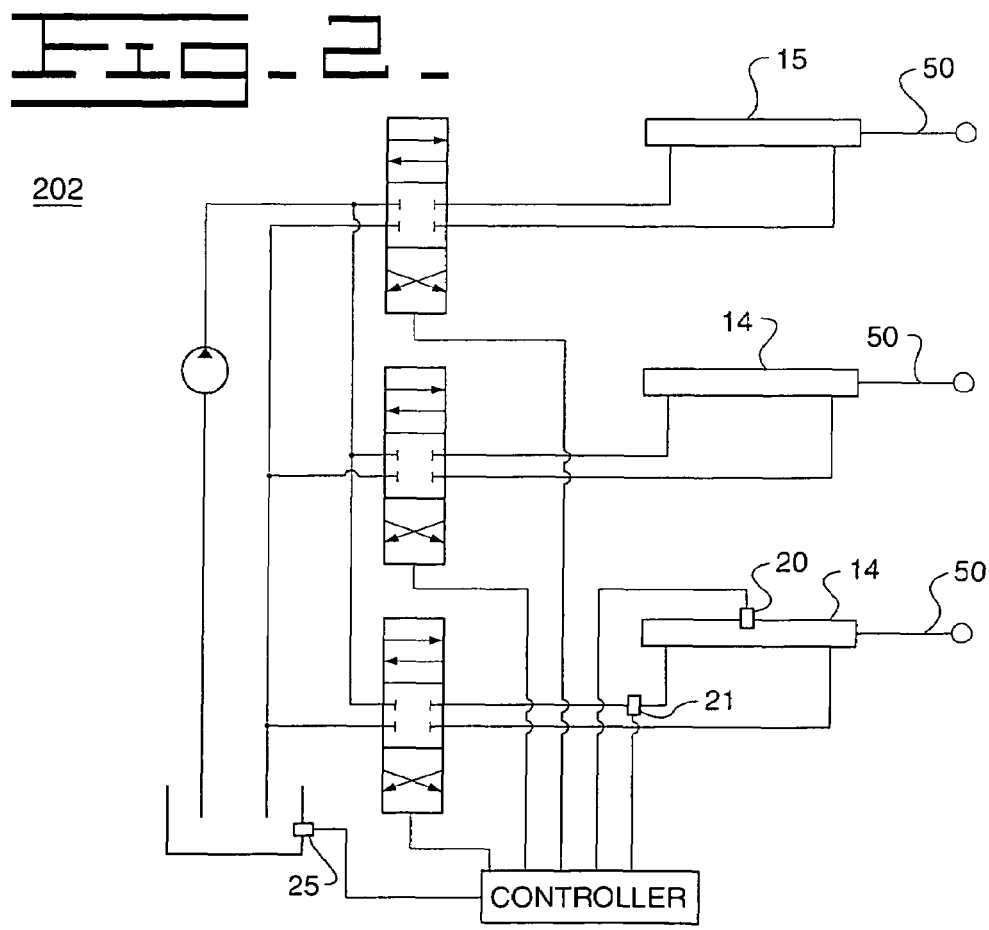
FIG. 2 is an example of a hydraulic circuit associated with an exemplary embodiment of the present invention.

FIG. 2 illustrates one example of an actuating circuit 202 connected to two lift cylinders 14 and a tilt cylinder 15. The extension sensor 20 is illustrated as a pressure sensor 20 that is associated with the cylinder to determine the position of the piston 50. The pressure transducer 21 may be located in other locations of the actuating fluid circuit 202 as long as the pressure transducer 21 is located in a manner that enables the sensing of a pressure indicative of the fluid pressure within the cylinder 14.

Figure 3:
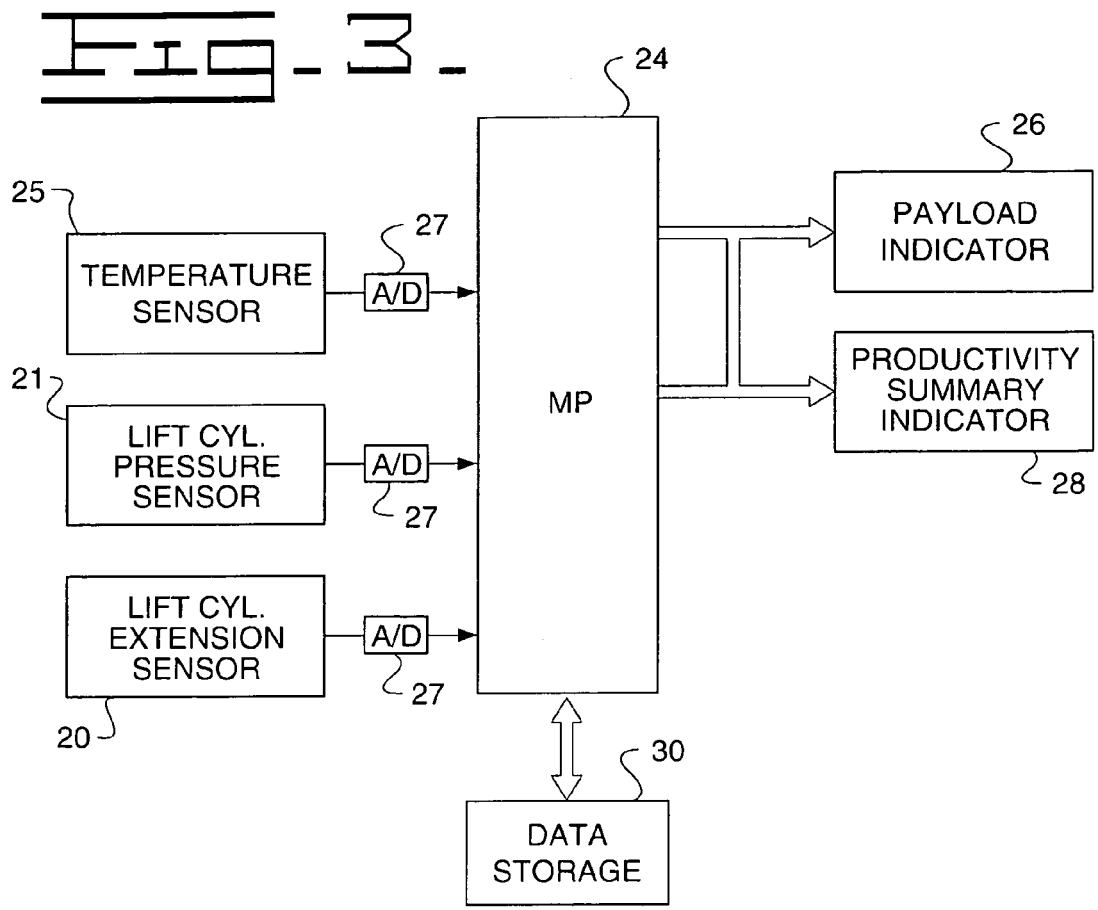
FIG. 3 is a block diagram of an exemplary embodiment of the present invention.

In addition, a temperature sensor 25, illustrated in FIGS. 2, and 3, may be used to sense the temperature of the fluid used in the actuating fluid circuit 202 connected to the lift cylinder 14. In the preferred embodiment, the temperature sensor 25 is located in a manner that enables the sensor to sense the temperature of the actuating fluid in the tank or fluid reservoir associated with the actuating fluid circuit 202. The temperature sensor 25 generates a signal indicative of the temperature of the actuating fluid. In the preferred embodiment, the actuating fluid is a hydraulic fluid, such as hydraulic oil.

Referring to FIG. 3, the cylinder pressure, extension sensor signals, and temperature signals are delivered to a microprocessor, or controller 24. In the preferred embodiment, the signals are processed by respective analog to digital (A/D) converters 27 before being delivered to the controller 24. In addition, the signals may be stored in internal memory within the controller 24 or in a separate storage device 30.

Figure 4:
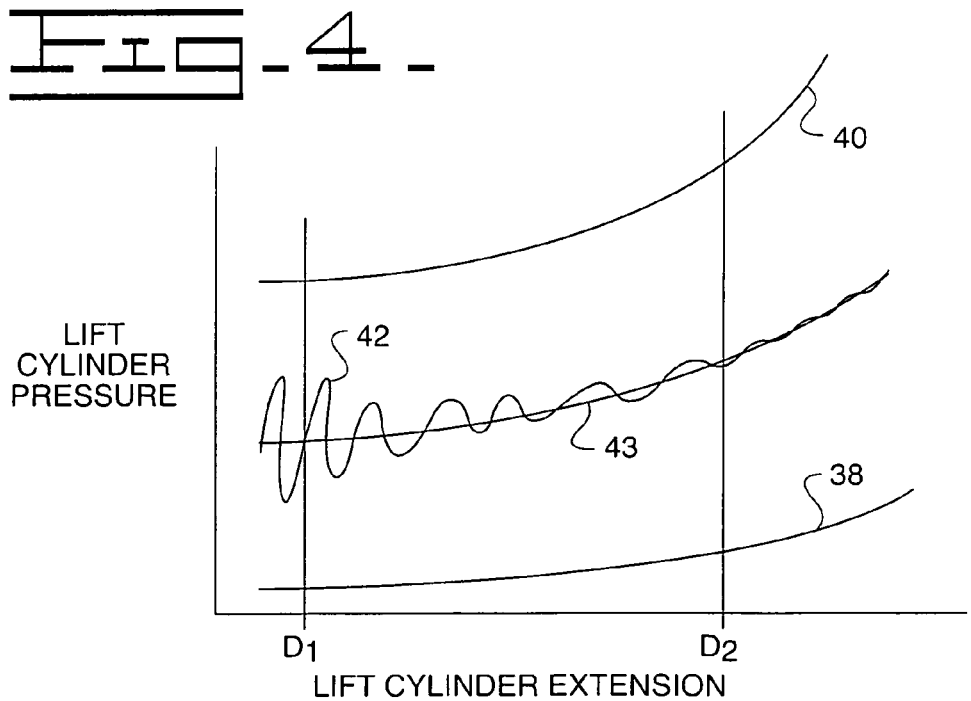
FIG. 4 is a graphical representation of cylinder pressure versus cylinder extension.

FIG. 4 graphically illustrates the relationship between cylinder pressure and cylinder extension in one embodiment of the present invention. The pressure and extension data are plotted on a graph having the lift cylinder pressure on the vertical Y-axis and the lift cylinder extension on the horizontal X-axis. A first curve 38 represents the curve fitted pressure versus extension data for a first weight of an empty loader bucket 16. A second curve 40 represents the curve fitted pressure versus extension data for a payload of known weight. These curves 38, 40, may be determined during a calibration procedure. The known weight is preferably at or near the rated load capacity of the machine 11. Of course, additional payload weights, rather than or in conjunction with the preferred empty load and near maximum rated load, may be used during the calibration process. The actual pressure signals received by the pressure transducer 21 have been curve fitted and averaged to remove random pressure surges to establish the first and second curves 38 and 40. The curves 38 and 40 may be sampled and stored as reference weight curves for the payload monitor system during the calibration process, as will be discussed below. As shown in FIG. 4, the lift cylinder pressure increases as the cylinder extension increases during the lifting of the payload carrier 16.

A third lift curve 43, illustrates a lift curve associated with an unknown weight. Curve 43, which is shown superimposed over trace 42, has been curve fitted and averaged to remove the random pressure surges. Trace 42 is a trace of actual pressure measurements in one example of a lift. The curve 43 is a representation of the pressure versus extension of the weight being measured. Experimentation has shown the lift cylinder pressure varies linearly with the weight of a payload at a particular cylinder extension. Therefore, the payload weight can be calculated by interpolation if the curve 43 falls between the reference curves 38 and 40 and by extrapolation if the curve 43 is outside of the reference curves 38 and 40.

Further, experimentation has also shown that fluid pressure within the actuating fluid circuit 202 is additionally dependent on the relative weight of the load being lifted. For example, the fluid pressure to lift an 8 ton load may increase by 20 kPa/° C. while the pressure required to lift a 4 ton load may increase by 10 kPa/° C. The fluid pressure necessary to lift a load decreases linearly in relation to the relative weight of the load.

FIGS. 5A and 5B illustrate one embodiment of the method of the present invention. The method is configured to compensate for changes in viscosity associated with the actuating fluid of the hydraulic circuit connected to the lift cylinders, during the dynamic measurement of a payload weight. The present invention includes a calibration procedure for the payload measurement system. The calibration procedure includes lifting two payloads, of different weights, and determining the variations in pressure measurements that occur during the lifting. A parameter indicative of viscosity of the actuating fluid is established during the calibration procedure. For example, in one embodiment, the temperature is determined in order to perform viscosity compensation for the payload being weighed. That is, in one embodiment, temperature measurements are used to account for changes in viscosity of the actuating fluid from the time the calibration procedure is performed to the time the payload of unknown weight is being lifted. In addition, the temperature measurements are scaled to account for the weight being lifted compared to the calibration weight.

In one embodiment, initiation of the calibration procedure may begin by the operator selecting a payload calibration option from a screen display (not shown), connected to the controller 24. The controller 24 may then initiate the calibration routine and monitor the lifting of the payload. Once the calibration routine is initiated, then, in a first control block 502, a first payload of a known weight is lifted. In the preferred embodiment, the payload carrier 16 is empty during one of the calibration lifts. Therefore calibration measurements may be taken using an empty payload carrier 16. In a second control block 504, a plurality of pressure values of the actuating fluid are sensed during the lifting of the first payload. In the preferred embodiment, a plurality of cylinder extension values are also sensed during the lifting of the first payload. In addition, the fluid pressure measurements and the extension measurements are preferably correlated with each other and stored in memory. In one embodiment, the payload is lifted from the ground level to a maximum lift position. However other variations in the range of the lift may be performed to acquire the pressure measurements.

In one embodiment, the payload measurement system continuously monitors cylinder extension. Based on analysis of the cylinder extension data, a determination may be made regarding whether the payload carrier 16 is being lifted. For example, if the cylinder extension exceeds a lifting extension threshold, the system may conclude a payload is being lifted and the fluid pressure may be sensed and stored, along with the associated cylinder extension measurements. If the cylinder extension exceeds a second lifting threshold extension, the lift may be determined to be completed, for the purposes of payload calculations. Alternatively, if the extension stops at one position more then a specified amount of time, then the lift may be considered completed. Alternatively, the lift may be considered completed when there is a rapid drop in fluid pressure, that is, when a payload carrier 14 dumps material, the fluid pressure in the cylinders 14 quickly drops.

In a third control block 506, a second payload of a known weight is lifted. In the preferred embodiment, the second payload is close to a maximum payload weight. In a fourth control block 508, a plurality of pressure values of the actuating fluid are sensed during the lifting of the second payload. In the preferred embodiment, a plurality of cylinder extension values are also sensed during the lifting of the second payload. In one embodiment, the sensed pressure values, and extension values if taken, are stored in memory. In addition, the fluid pressure measurements and the extension measurements are preferably correlated with each other and stored in memory.

In one embodiment, the hydraulic circuit conditions are the same for each of the lifts. For example, the velocity for each of the lifts is preferably the same.

In a fifth control block 510, a first parameter indicative of viscosity of the fluid during the first and second lifts is established. In the preferred embodiment, the actuating fluid temperature ($T_{calibration}$) is sensed, as the parameter indicative of viscosity. Therefore, the temperature of the actuating fluid associated with the first and second lifts is established. The first and second lifts are preferably taken relatively close together from a time perspective, such that there is a minimal change in actuating fluid temperature ($T_{calibration}$). Therefore, the temperature of the actuating fluid may be sensed during the second lift and stored and utilized as the temperature associated with the first and second lifts. In one embodiment, the temperatures are compared with each other. If a difference between the temperatures of the first and second lifts exceeds a temperature threshold, e.g. 2 degrees, then the calibration process may be aborted and started over. If the temperature difference is less than the temperature threshold, then either one of the temperature values may be used to represent the temperature ($T_{calibration}$) during the lifts, or the temperatures may be averaged together. In an alternative embodiment, the temperatures may be simply averaged together. In any case, a temperature ($T_{calibration}$) associated with the first and second lifts is established and stored in memory. In one embodiment, the measurements for calibration have been acquired and the payload system is now ready for operation.

In a sixth control block 512, during the operation of the machine, a third payload of unknown weight is lifted. In a seventh control block 514, a plurality of pressure values are sensed during the lifting of the unknown weight. In an eighth control block 516, a parameter indicative of the viscosity of the actuating fluid is established. In the preferred embodiment, the parameter established is the temperature of the actuating fluid ($T_{current}$). Therefore, the temperature is sensed during the lifting of the unknown weight. As discussed above, the determination of when a lift is beginning or ending may be made based on monitoring the extension and change thereof of the cylinders, and/or monitoring the fluid pressure and change thereof. Therefore, in one embodiment, the payload measurement system is not continuously attempting to determine a payload weight when the machine is not performing a lifting operation.

In a ninth control block 518, a payload weight ($W_{current}$) of the third payload is established in response to the first and second viscosity indicative parameters (e.g., the first and second temperatures ($T_{calibration}$ and $T_{current}$)), the first, second, and third plurality of fluid pressure values, and the first and second payload weights. In the preferred embodiment, the payload weight ($W_{current}$) of the third payload is not established until the lifting of the third payload is completed. Alternatively, the payload may be determined as the data is being collected, or as soon as all of the desired data is collected. In addition, the extension sensor data is preferably used to determine the payload weight of the third payload.

In the preferred embodiment, the establishment of the third payload weight ($W_{current}$) includes determining an uncompensated weight value (W') for the payload. The uncompensated payload weight is then modified to compensate for the relative weight of the load being lifted.

A first differential pressure between the fluid pressures sensed during the lifting of the unknown weight and the fluid pressures sensed during the lifting of an empty bucket (i.e., the first lift) is determined. A second differential pressure between the fluid pressures sensed during the lifting of the known weight and the fluid pressures sensed during the lifting of the empty payload weight is determined. The first differential pressure is divided by the second differential pressure and the result is multiplied by the known payload weight ($W_{calibration}$). The following equation is used in the preferred embodiment to determine the uncompensated, unknown payload weight (W').

$$W' = W_{calibration} * \frac{\sum_{i=1}^{n} \frac{Pd_i}{Cd_i}}{n}$$

Where:
- $W_{calibration}$ is the known weight at calibration time, i.e., the second weight minus the first weight;
- Pd is the difference between the sensed fluid pressure at a given cylinder extension during the lifting an unknown weight and the associated pressure sensed during the lifting of an empty bucket;
- Cd is the difference between the sensed fluid pressure for a given cylinder extension during lifting of a known weight and the associated sensed pressure for a given cylinder extension during the lifting of an empty bucket; and
- n is the number of pressure measurements used in the determination. In one embodiment, all the valid pressure measurements received are used. Alternatively a subset of one or more measurements may be used.

Once the uncompensated weight (W') for the third payload is determined, the weight may be modified to compensate for the relative load being lifted.

The uncompensated weight (W') may then be modified to compensate for the load changes. The change in temperature of the actuating fluid since the time of calibration ($T_{current} - T_{calibration}$) may also be scaled to compensate for temperature fluctuations. This change in the temperature of the actuating fluid ($T_{current} - T_{calibration}$) may also be scaled as a function of the relative weight of the payload to accommodate for load changes and fluctuations due to temperature. Scaled factors or coefficients may be determined from a comparison between system determined payload weights in the system and certified weights, such as weight measurements made at a certified scale house. In the preferred embodiment, the equation for determining the actual, compensated weight ($W_{actual}$) of the third payload is as follows:

$$W_{actual} = a*W' + b*(T_{current} - T_{calibration}) + c*(W'*(T_{current} - T_{calibration})) + d$$

Where:
- $T_{current}$ is the sensed temperature of the actuating fluid when the third payload is lifted;
- $T_{calibration}$ is the actual temperature of the actuating fluid sensed at the time of calibration;
- a is a scalar conversion coefficient (unitless) that compensates for a non-unity relationship between uncompensated weight and actual weight;
- b is a scalar conversion coefficient (kg/° C.) that compensates for the effects of temperature on the uncompensated weight;
- c is a scalar conversion coefficient (° C.$^{-1}$) that compensates for load changes due to the interaction of temperature and uncompensated weight; and
- d is a scalar value (kg) adjusting for any fixed offset present in the system.

In the preferred embodiment, the calibration process is performed when the actuating fluid temperature is above a calibration temperature threshold. Experimentation has indicated that when the actuating fluid is below a temperature threshold, e.g., 50 degrees Celsius, the pressure readings may vary dramatically during the calibration process leading to inaccurate payload measurements. In one embodiment the system is said to reach a steady state when the actuating fluid temperature is at or above the calibration temperature threshold. Therefore, in the preferred embodiment, if the fluid temperature is below a calibration temperature threshold, the system will not perform calibration. If previous calibration values are available, the previous values may continue to be used for payload measurements. Alternatively, the operator of the machine may let the engine warm up, e.g., run the engine at high idle, or lift the bucket 16 one or more times, until the actuating fluid temperature increases such that calibration may be performed.

INDUSTRIAL APPLICABILITY

The operation of the present invention is best described in relation to its use in loading applications where knowledge of payload weight is important. This payload measurement system is valuable in operations where it is desirable to monitor loader vehicle productivity. This system may make for a more automated process and improve the ease of use to provide accurate payload measurements.

Prior to using the payload monitor 10, the system should be calibrated. Calibration should also be repeated whenever there has been a change in the lift arm assembly configuration, such as switching to a different bucket 16, or substantial overhaul of any of the lift arm assembly subsystem. In the preferred embodiment, calibration of the payload monitor 10 includes lifting the lift arm assembly 12 from ground level to dump level with an empty bucket 16, establishing the payload weight, and repeating the procedure with material of a known weight in the bucket 16. Preferably, the known weight is near or at the rated capacity of the loader vehicle 11. In addition, preferably the bucket 16 should be racked back during the lifting process to ensure that the center of gravity (C.G.) of the payload weight remains near the center of the bucket 16. The racked back bucket 16 constraint may be removed by including a position sensor in the tilt cylinder 15 to sense the degree of bucket tilt to compensate for the C.G. shift.

A typical loading cycle of a loader 11 includes, sequentially: digging and/or crowding a stock pile, racking back the bucket 16 to maintain the load, reversing and backing out of the pile while raising the bucket 16, traveling to a dump site or a transport vehicle while continuously raising the bucket 16, and finally dumping the load from the raised position. This loading cycle is not interrupted by the usage of the dynamic payload monitor 10 because stopping the machine 11 is not required and the bucket 16 is not required to be positioned to a specific height for a period of time.

The present invention is also expandable to other machines with different linkage configurations by compensating for the difference thereof. Anticipated applicable machine types include excavators, front shovels, backhoe loaders, dump trucks, and any machines having at least one linkage with at least one hydraulic cylinder for modifying that linkage configuration. For these vehicle linkage configurations, additional pressure and extension sensors may be needed to detect cylinder pressure and linkage geometry during the work cycle. However, the basic payload weight calculations remain the same.

Other aspects, objects, and advantages of the present invention can be obtained from a study of the drawings, the disclosure, and the claims.

What is claimed is:

1. A method for dynamically measuring a payload weight for a machine having at least one cylinder for elevating a payload carrier, the cylinder being connected to a fluid circuit having an actuating fluid, comprising:
    elevating the payload carrier with the at least one cylinder of the machine;
    determining a calibration weight associated with the payload carrier;
    determining a calibration temperature of the actuating fluid of the fluid circuit of the machine at the time of calibration weight determination;
    determining an uncompensated payload weight;
    determining a temperature change between the calibration temperature and a current temperature;
    applying a first scaling conversion factor to the temperature change;
    applying a second scaling conversion factor to the uncompensated payload weight; and
    determining the payload weight as a function of at least the uncompensated payload weight and the scaled temperature change.

2. The method, as set forth in claim 1, wherein applying the first scaling conversion factor converts a temperature factor to a weight factor.

3. The method, as set forth in claim 1, wherein the second scaling conversion factor is a scalar coefficient that compensates for a non-unity relationship between the uncompensated payload weight and an actual weight; and
    wherein the payload weight is determined as a function of at least the scaled uncompensated payload weight.

4. The method, as set forth in claim 1, further comprising:
    applying a third scaling conversion factor to a multiplied product of the temperature change and the uncompensated payload weight.

5. The method, as set forth in claim 4, wherein the third scaling conversion factor is a scalar coefficient that compensates for load changes due to interactions between temperature and the uncompensated payload weight; and
    wherein the payload weight is determined as a function of at least the scaled multiplied product of the temperature change and the uncompensated payload weight.

6. The method, as set forth in claim 4, further comprising:
    adjusting any offset to zero.

7. The method, as set forth in claim 1, wherein the step of determining the calibration weight includes:
    lifting a first payload having a first payload weight;
    sensing a first plurality of pressure values of the actuating fluid during the lifting of the first payload;
    lifting a second payload having a second payload weight; and
    sensing a second plurality of pressure values of the actuating fluid during the lifting of the second payload.

8. The method, as set forth in claim 7, wherein the step of determining the uncompensated payload weight includes:
    lifting a third payload having a third payload weight; and
    sensing a third plurality of pressure values of the actuating fluid during the lifting of the third payload.

9. A method for dynamically measuring a payload weight for a machine having at least one cylinder for elevating a payload carrier, the cylinder being connected to a fluid circuit having an actuating fluid, comprising:
    elevating the payload carrier with the at least one cylinder of the machine;
    determining a calibration weight associated with the payload carrier;

determining a calibration temperature of the actuating fluid of the fluid circuit of the machine at the time of calibration weight determination;

determining an uncompensated payload weight;

determining a temperature chance between the calibration temperature and a current temperature;

applying a first scaling conversion factor to the temperature change;

applying a second scaling conversion factor to the uncompensated payload weight; and determining the payload weight as a function of at least the uncompensated payload weight and the scaled temperature change, wherein the first scaling conversion factor is a scalar coefficient that compensates for effects of temperature on the uncompensated payload weight.

10. A method for dynamically measuring a payload weight for a machine having at least one cylinder for elevating a payload carrier, the cylinder being connected to a fluid circuit having an actuating fluid, comprising:

elevating the payload carrier with the at least one cylinder of the machine;

determining a calibration weight associated with the payload carrier;

determining a calibration temperature of the actuating fluid of the fluid circuit of the machine at the time of calibration weight determination;

determining an uncompensated payload weight;

determining a temperature change between the calibration temperature and a current temperature;

applying a first scaling conversion factor to the temperature change;

applying a second scaling conversion factor to the uncompensated payload weight;

applying a third scaling conversion factor to a multiplied product of the temperature change and the uncompensated payload weight;

adjusting any offset to zero; and determining the payload weight as a function of at least one of the scaled uncompensated payload weight, the scaled temperature change, the scaled multiplied product, and the adjusted offset.

\* \* \* \* \*